United States Patent Office 3,168,483
Patented Feb. 2, 1965

3,168,483
DIAZABICYCLOOCTANE-ALKYLENE OXIDE CATALYST COMPOSITIONS
Burton D. Beitchman, Drexel Hill, Pa., and William E. Erner, Wilmington, Del., assignors to Air Products and Chemicals, Inc., a corporation of Delaware
No Drawing. Filed Jan. 17, 1961, Ser. No. 83,150
3 Claims. (Cl. 252—426)

This invention is directed to new catalysts and new combinations of catalysts useful in the formation of either elastomeric or rigid and either foamed or unfoamed polyurethanes from diisocyanates and polyols. Furthermore, the catalysts and combinations of catalysts herein described are effective in producing controlled polymerization of isocyanates to polyisocyanates, e.g., isocyanate resins.

The catalytic activity of diazabicyclooctane (1,4-diazabicyclo-(2.2.2)-octane) in effecting the formation of polyurethane elastomers or foams by the interaction of diisocyanates and hydroxy compounds is well recognized in the polyurethane art, e.g., U.S. #2,939,851. In the extensive development work which has been done since one-shot polyurethane foams were realized for the first time with diazabicyclooctane catalyst, various other components have been added to the polyurethane system or to diazabicyclooctane to assist or modify its catalytic effect. For example, foam stabilizers, such as organosilicones, albumen, or gelatin, have been added to obtain more stable, lower density products; co-catalysts, such as organo-tin soaps, have been added to obtain more rapid foaming and more stable foams; catalyst modifiers, such as acids, acid salts or esters, have been introduced to effect delayed catalytic action; and supplementary blowing agents, such as Freon, have been added to obtain lighter foamed products.

In polyurethane formation the principal reaction is between a polyisocyanate and a polyol to produce urethanes, which are extended chain-wise to build up linear polymers due to the polyfunctionality of the isocyanate and hydroxy compound:

(1)
$$R\begin{matrix}NCO\\ \\NCO\end{matrix} + R'\begin{matrix}HO\\ \\HO\end{matrix} \xrightarrow{catalyst} HO\begin{bmatrix}R'-O-\overset{O}{\underset{\|}{C}}-NH-R\end{bmatrix}_x NCO$$

This primary formation of a linear urethane polymer is accompanied:

(a) By a cross-linking reaction, e.g., between excess diisocyanate and the secondary —NH group of the urethane:

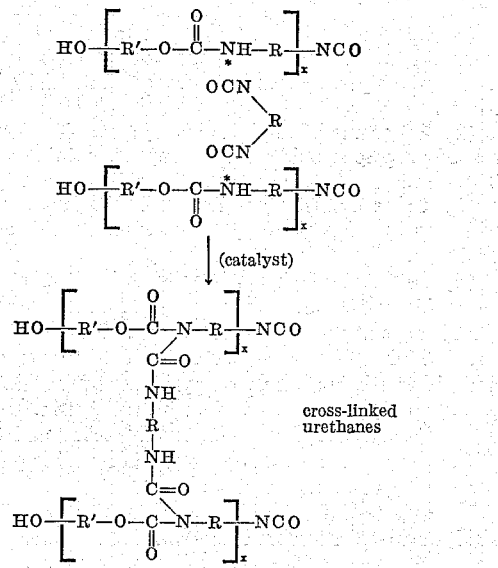

cross-linked urethanes and/or (b) by a blowing or foaming process arising from the reaction of free isocyanate (above that required for urethane formation and cross-linking) and water to form a ureide and release carbon dioxide:

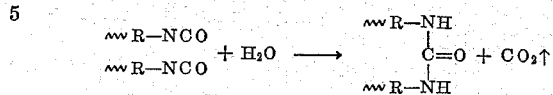

At the same time, isocyanates present in the isocyanate-polyol reaction mixture can be polymerized with tertiary amine catalysts. Such isocyanate polymerization has been described by Arnold, Chem. Rev. 57, 47 (1957) and Kogon, J.A.C.S., 78, 4911 (1956), who recognized the formation of polymers from phenyl isocyanates in the presence of tertiary amine catalysts, such as pyridine, triethyl amine, N-methyl morpholine, and the like:

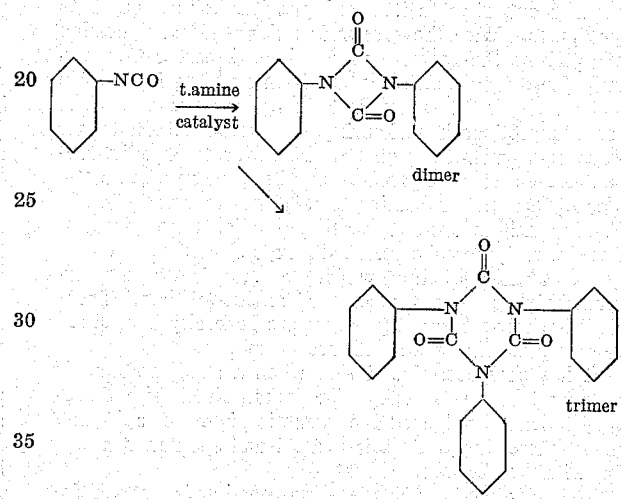

Thus, isocyanates present in the urethane reaction mixture with tertiary amines may be diverted from urethane formation by self-polymerization.

While isocyanate polymerization is normally a much slower process than the catalyzed polyurethane reaction, under certain conditions and in the presence of certain catalyst combinations isocyanate polymerization is considerably accelerated to make this competitive reaction of significant importance in the polyurethane system.

It can be appreciated from the diversity of the reactions that an essentially instantaneous catalytic conversion of an organic diisocyanate and a polyol from mobile liquids to stable, flexible or rigid solids is indeed a complex process requiring active versatile catalysts, or combinations of catalysts selective in producing polymers having the desired density, flexibility, thermal stability, tensile strength and other desired physical and chemical characteristics.

Accordingly, an object of the present invention is the formulation of a catalyst to effect rapid "one-shot" addition polymerization of polyols and diisocyanates to produce stable, self-cured elastic or rigid foamed or unfoamed polymeric resins.

Another object of the present invention is the formulation of catalysts effective in producing rapid polymerization of organic isocyanates, which may be copolymerized with polyurethanes as block co-polymers, or may be further polymerized per se to polymeric resins.

Another object of the present invention is the formulation of catalysts based on diazabicyclooctane which are more active, more versatile and less expensive than diazabicyclooctane alone.

These and other objects are accomplished as hereinafter described:

In accordance with the present invention, (1) polymerization of isocyanates and (2) reaction of isocyanates and hydroxy compounds to form urethanes, respectively, are promoted by a catalyst composition consisting of diazabicyclooctane and at least one lower alkylene oxide of the group consisting of ethylene, propylene and butylene oxide.

Since the catalytic effect of diazabicyclooctane in polyurethane systems is well recognized, the novelty of our invention resides in the discovery of the particular phenomena produced by $C_2$ to $C_4$ alkylene oxides in conjunction with diazabicyclooctane.

In typical "one-shot" polyurethane foam preparation a diisocyanate, such as tolylene diisocyanate, is reacted with a polyol, such as polypropylene glycol of about 2000 to 3000 molecular weight in the presence of an effective tertiary amine catalyst such as diazabicyclooctane, water and other additives such as organo-silicone foam stabilizers. The aqueous solution of the catalyst and silicone is usually dissolved in the polyol and this solution then mixed with the diisocyanate. With rapid mixing the batch becomes "creamy" in a few seconds and, after pouring out, rises to its maximum height in about 1 to 2 minutes. With the proper selection and concentration of catalysts the foamed polyurethane becomes firm and tack-free, though not fully cured, on standing from 10 to 20 minutes or thereabout at ordinary temperatures. The foamed product is self-curing, i.e., stabilized on longer standing at room temperature. However, to expedite production, the foamed product may be oven cured to a stable, dry product on heating for about 1 hour at 200–250° F. In machine made foams the ingredients are mixed instantaneously and the creamed mix is ejected continuously onto a moving belt on which the foam rises to its maximum height in 1 to 3 minutes of belt travel time. These machine made foamed products are generally heat cured to obtain the maximum production rate.

It has now been found that when a small amount of lower aliphatic alkylene oxide is combined with diazabicyclooctane, polyurethane formation is more rapid, and more interestingly, there is a rapid and spontaneous curing with the liberation of heat.

The nature of the accelerating reaction is not yet defined, nor the specific contribution that the alkylene oxides make to the reaction. The several components and their interaction have been studied in various combinations. We have found that (a) hydroxy compounds, such as the polyether polyols used in polyurethane production do not react with diazabicyclooctane with or without alkylene oxides, (b) organic isocyanates do not appear to react at all with alkylene oxides in essentially dry state, (c) isocyanates polymerize only very slowly in the presence of diazabicyclooctane and then principally to form the dimer rather than any higher (solid) polymer, (d) diazabicyclooctane and $C_2$ to $C_4$ alkylene oxides react very slowly with each other (over 90 hours) to form a dark oily product. In view of even this very slow reaction of diazabicyclooctane with alkylene oxides, it is preferable to use the diazabicyclooctane-alkylene oxide combination of the instant invention in freshly prepared form or relatively soon after mixing, preferably within 4 to 6 hours, and (e) organic isocyanates in the presence of a combination of diazabicyclooctane and a $C_2$ to $C_4$ alkylene oxide react rapidly with notable heat generation to form isocyanate polymers or resins.

From these observations it is evident that catalytic polymerization of isocyanates is the key to the reaction. With diazabicyclooctane alone this reaction is relatively slow and exothermic heat is released at a slow, apparently subcritical rate. However, the combination of diazabicyclooctane and $C_2$ to $C_4$ alkylene oxides causes the polymerization to go so rapidly that the heat evolved effects an essentially autocatalytic reaction which may even approach an explosive rate. Thus, diazabicyclooctane and a small amount of an alkylene oxide, such as ethylene, propylene or butylene oxide acting as co-catalysts can apparently produce enough heat by isocyanate polymerization to trigger a broader range polymerization process such as the polyurethane reaction.

The diazabicyclooctane-epoxide catalyzed polymerization of isocyanate can be moderated from a near explosive rate to practical useful levels by the use of smaller quantities of catalysts, solvents or unreactive diluents, or by the gradual addition of a reactant, such as the isocyanate to the reaction mixture.

It is interesting to note that the isocyanate dimerization reaction involves an equilibrium in which dimer is moderately stable at low temperatures, but is highly dissociated or fully dissociated at moderately higher temperatures, for example, with tolylene diisocyanate—

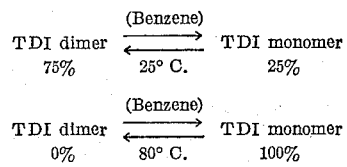

The role of isocyanate polymerization catalysts and isocyanate polymers in urethane polymerization is clarified considerably by these findings. In a urethane system where isocyanates are present in a high molar ratio, the formation of isocyanate dimer at low initial temperatures at the initiation of the reaction effectively reduces the isocyanate concentration and thus buffers the reaction, especially in slowing down the hydrolysis of isocyanates with the formation of ureides. As the polymerization and condensation reactions progress and warm up, the isocyanate-polymer equilibrium favors polymer dissociation and reactive isocyanate becomes available again for the urethane and ureide reactions. Active isocyanate polymerization catalysts, such as our diazabicyclooctane-alkylene oxide combination act to control the polyurethane condensation and foaming processes and effectively distribute the reaction over a broader temperature range to produce more uniform, evenly textured polyurethane foams.

While isocyanates have been polymerized (a) with tertiary amines, (b) with lower $C_2$ and $C_4$ alkylene oxides and tertiary amine such as pyridine and (c) with styrene oxide and diazabicyclooctane, these combinations are invariably slow and inefficient when compared with the combination of $C_2$ to $C_4$ alkylene oxides and diazabicyclooctane.

EXAMPLE I

*Polymerization of aryl isocyanates with alkylene oxides and tertiary amines other than diazabicyclooctane*

(1) 20 grams of phenyl isocyanate in pyridine solution with two drops of propylene oxide required 24 hours at room temperature to produce a substantial yield of trimer.

(2) 4.8 grams of tolylene diisocyanate (TDI) plus 10 ml. of propylene oxide and 1 drop of pyridine required 24 hours at room temperature to produce a firm gel.

(3) Using similar quantities, TDI in ethylene oxide with 1 drop of pyridine gave the same result—a gel in 24 hours.

(4) 20 grams of phenyl isocyanate in 10 ml. of ethylene oxide and 1 ml. of pyridine yielded the trimer only after 2 days at room temperature or 3 days at 0° C.

(5) TDI with a molecular equivalent of styrene oxide and either triethyl amine or pyridine required 18 hours at room temperature to produce a brittle resin.

(6) Phenyl isocyanate with styrene oxide and triethyl amine gave only a viscous polymer on standing overnight (18 hours) at room temperature.

It is apparent that isocyanate polymerization with such catalysts would not contribute sufficient exothermic heat to activate a rapid polyol-isocyanate reaction as is required for "one-shot" polyurethane formation, nor act as a means of sequestering isocyanates temporarily as lower polymers.

Since isocyanate polymerization is an exothermic reaction, the observed rate of temperature rise or the time elapsed to the maximum temperature observed in the reaction is proportional to the reaction rate. On this basis, propylene oxide and styrene oxide have been compared:

EXAMPLE II

*Isocyanate polymerization with diazabicyclooctane comparing propylene oxide and styrene oxide*

[Using 61 g.=0.35 mol TDI]

| Diazabicyclooctane | Propylene Oxide | Time (minutes) to max. temperature |
|---|---|---|
| .25 g., .002 mol | 1.7 g., .03 mol | 8 |
| | Styrene Oxide | |
| 25 g., .002 mol | 3.6 g., 0.3 mol | 48 |

It is evident that propylene oxide, as a co-catalyst with diazabicyclooctane, is many (approximately 6) times more active than styrene oxide.

The particular effectiveness of an alkylene oxide (propylene oxide) over epichlorohydrin when used in combination with diazabicyclooctane is shown in a series of experiments with phenyl isocyanate and tolylene diisocyanate:

EXAMPLE III

*Epichlorohydrin vs. propylene oxide*

A. IN PHENYL ISOCYANATE POLYMERIZATION

| Diazabicyclooctane, g. | Epichlorohydrin, g. | $\phi$NCO, g. | Product Gel Time, min. |
|---|---|---|---|
| 0.11 | 11.8 | 10.5 | 45 |
| | Propylene Oxide, g. | | |
| 0.10 | 10.0 | 9.8 | 3-4 |

With phenyl isocyanate the combination of diazabicyclooctane and propylene oxide was many fold (11 to 15 times) more active than the combination of diazabicyclooctane and epichlorohydrin.

B. ALKYLENE OXIDES AND DIAZABICYCLOOCTANE IN TOLYLENE DIISOCYANATE POLYMERIZATION

| Diazabicyclooctane | | Alkylene Oxide | | TDI | Time (minutes) to max. temp. |
|---|---|---|---|---|---|
| Grams | 0.25 | Ethylene | 0.9 | 61 | 3.0. |
| Mols | .002 | | 0.02 | .35 | |
| Grams | 0.25 | Propylene | 1.66 | 61 | 6.3. |
| Mols | .002 | | 0.03 | .35 | |
| Grams | 0.25 | Butylene | 2.16 | 61 | 7.7. |
| Mols | .002 | | 0.03 | .35 | |
| Grams | 0.25 | Neohexene | 3.0 | 61 | Slow, sticky white product. |
| Mols | .002 | | 0.03 | .35 | |
| Grams | 0.25 | Octylene | 50 | 73 | Slow, vis. syrup in 180 minutes. |
| Mols | .002 | | 0.37 | 0.43 | |

With tolylene diisocyanate, on further evaluation of the alkylene oxides, activity of the alkylene oxide-diazabicyclooctane combination was highest with ethylene oxide and decreased in the order of ethylene>propylene>butylene>>>neohexene>octylene, etc. Furthermore, a critical point in the activity values is reached with alkylene oxides higher than butylene oxide. Neohexene oxide gave a slow release of heat (only a 7° C. exotherm was measured up to 20 minutes) and the product was a sticky white gel. Octylene oxide was far less active. Even with roughly equi-molar amounts of octylene oxide and isocyanate and the same small amount of diazabicyclooctane, the reaction was very slow, giving a viscous syrup in 180 minutes, with only a small observable temperature rise.

The effective isocyanate polymerization catalyst combination will have from 0.1 mol to 10 mols of diazabicyclooctane to from 0.01 mol to 100 mols of alkylene oxide per 100 mols of isocyanate, or preferably, from 0.5 mol to 5 mols of diazabicyclooctane to from 0.05 mol to 10 mols of alkylene oxide per 100 mols of isocyanate. As has been noted in the examples above, in some cases very small (droplet) amounts of alkylene oxide exert a catalytic effect in the presence of conventional amounts, e.g., 0.5 to 5 parts of amine catalysts per 100 parts of isocyanate. Conversely, with massive quantities of alkylene oxide used as solvent, a distinct catalytic effect in isocyanate polymerization is shown by very small quantities of amine catalyst. Our invention is demonstrable with one percent of either of the co-catalysts with the coacting component.

However, a combination of catalysts is proposed in the concentration range preferred above which will give a rapid release of heat to attain a maximum exotherm in the reaction system in a period of about 8 minutes or less, as shown in Example III-B.

EXAMPLE IV

A formulation for preparation of an isocyanate resin follows:

| | Mol |
|---|---|
| 250 parts wt. diisocyanato-phenyl methane | 1.0 |
| 85 parts wt. phenyl isocyanate | 0.7 |
| 5.5 parts wt. diazabicyclooctane | .05 |
| 3.3 parts wt. propylene oxide | .05 |

An aliquot part of the above ingredients, when mixed and warmed slightly to effect bulk polymerization, forms a tough yellow gel, in about 2 to 3 minutes. The cold (unreacted) fluid mix can be used to impregnate sample panels of glass fiber fabric to form laminataes having high heat resistance, flexural strength, tensile strength, etc. Six layer laminates prepared by impregnating previously heat-treated and dried sheets of glass fabric with the cold bulk reaction mixture, drying and pressing in a mold at 70 to 100° C. at pressures of 150 to 500 p.s.i., are pale yellow opaque sheets approximately 0.08 inch thick having excellent stability, tensile strength, flexural strength, adhesion and resistance to hydrolysis. Typical tests on such glass laminate panels show:

| | |
|---|---|
| Wt. percent loss, ½ hr. at 700° F. | 9.7 to 11.2 |
| Tensile, lb./in.² | 33,000 to 45,000 |
| Flexural failure, lb./in.² | 37,000 to 40,000 |
| Adhesion after ¼ hr./700° F. | Good |
| Tensile after ½ hr./700° F., lb./in.² | 32,000 to 42,000 |
| Flexural failure after ½ hr./700° F., lb./in.² | 22,000 to 28,000 |
| Tensile after 3 days' immersion, lb./in.² | 33,000 to 42,000 |

In view of our discovery of the phenomenal activity of diazabicyclooctane when used in combination with a small amount of lower alkylene oxide in catalyzing both urethane formation and organic isocyanate polymerization, it now becomes apparent that isocyanate polymers con be formed rapidly in the presence of this co-catalyst combination and, aside from the effect of the exothermic heat of polymerization in accelerating the rate of reaction in the whole system, the isocyanate polymers can react in the urethane system on the basis of free isocyanate groups present, as obtained on dissociation of the dimer, or as remain unreacted in an iso-cyanurate polymer, to form isocyanate modified polyurethanes or urethane modified polyisocyanurates having new and unusual properties. The following scheme shows these reactions:

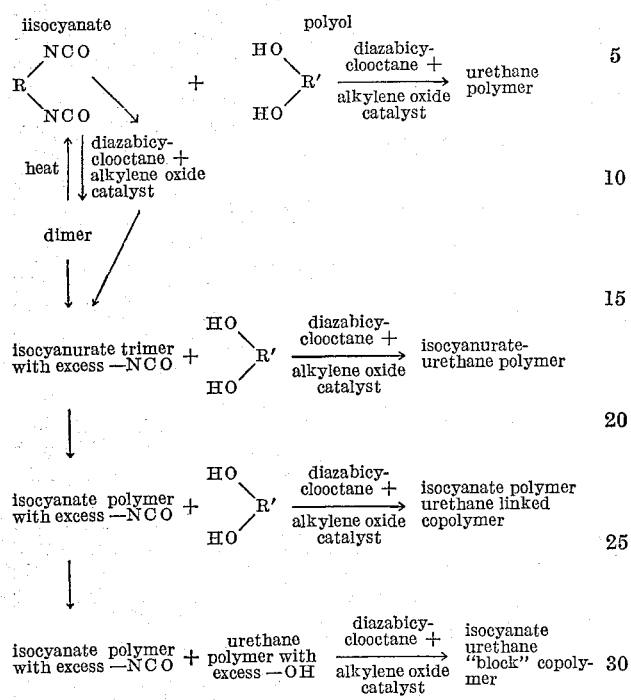

Polyisocyanates retaining reactive isocyanate groups may also be reacted with (a) alcohols or mixtures of mono- and polyols to introduce urethane substituents in the isocyanurate polymer as well as urethane linked polyisocyanates, (a)

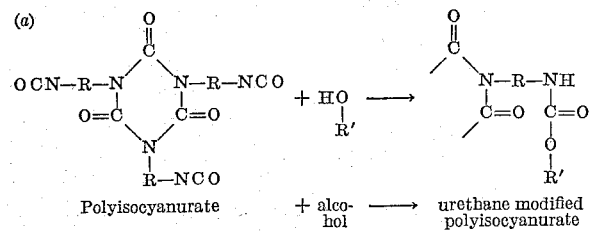

(b) amines to form ureide linked polyisocyanates,

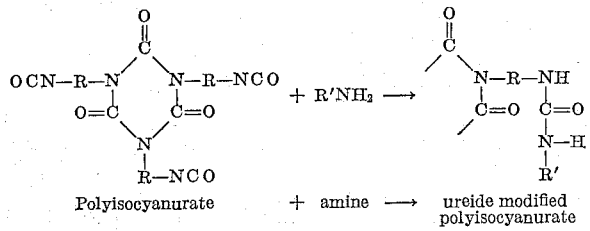

and (c) water (and/or other $CO_2$ releasing reagents) to form blown ureide linked polyisocyanates, thus producing foamed polyisocyanates,

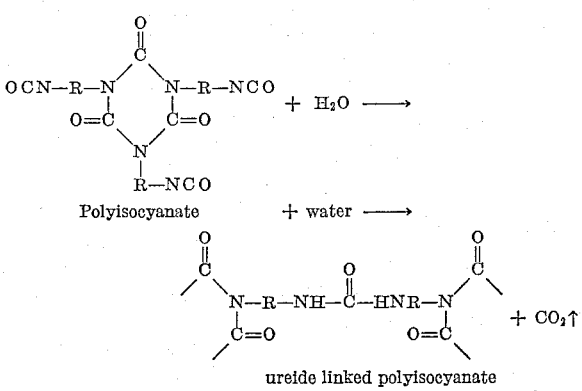

An example of such a urethane modified polyisocyanate follows:

EXAMPLE V

To 51.2 g. of heptadecanol, 0.25 g. of diazabicyclooctane, 4.0 ml. of propylene oxide and 28.5 ml. of Hylene TM (tolylene diisocyanate, Du Pont, comprising a mixture of 80% of the 2,4-isomer and 20% of the 2,6-isomer) were combined with stirring. Within two minutes the pot temperature rose to about 214° F. and on cooling a pale yellow solid was formed which was deformable like putty but became a rigid solid on further cooling. This product had a molecular weight of 1264 [theory 1290 for 3 (R'OH—RNCO)]. The higher alcohol reacted produced a hard waxy solid useable as a sealant. Lower alcohols would yield more crystalline polymers. In the absence of propylene oxide, or diazabicyclooctane, or both from the above composition only a urethane type of reaction took place between the alcohol and TDI at room temperature giving a clear water white slightly viscous liquid. After 15 hours at 150° C. this reaction mixture produced a dark viscous orange syrup, still different from the waxy solid product obtained with diazabicyclooctane and olefin oxide. Heating the orange syrupy reaction mixture still further for 63 hours at 150° C. produced only a dark viscous syrup having a molecular weight of 824 [theory 860 for 2 (R'OH—RNCO)].

When Nacconate 300 (National Aniline, 4,4'-diphenyl methane diisocyanate) was used instead of Hylene TM in Example V with diazabicyclooctane and propylene oxide, a white paste resulted which on heating 1 hour at 135° C. gave a yellow rigid solid.

With a mixture of mono- and polyols or unsaturated alcohols in the above reaction with diazabicyclooctane and propylene oxide present as co-catalysts, a series of polyisocyanate-polyol resins was formed having a plastic waxy structure and good coating and sealing characteristics:

ISOCYANATE-ALKANOL-POLYOL REACTION WITH 0.25 G. DIAZABICYCLOOCTANE AND 4.0 ML. PROPYLENE OXIDE

| Alcohol | G. | Polyol | G. | Isocyanate | G. | Product |
|---|---|---|---|---|---|---|
| $C_{17}$ | 34 | Quadrol [a] | 17 | TDI | 35 | Thermoplastic brittle solid. |
| $C_{17}$ | 49 | ___do___ | 0.5 | TDI | 35 | Pale yellow waxy solid. |
| $C_{17}$ | 49 | PPG 1000 [b] | 5 | TDI | 35 | Do. |
| $C_{17}$ | 34 | PPG 1000 [b] | 33 | TDI | 35 | Sticky spongy product. |
| $C_{17}$ | 26 | $CH_2$=CH—$CH_2$OH [c] | 6 | TDI | 35 | Yellow brittle product. |

[a] Quadrol—Tetrakis-2-hydroxypropyl ethylene diamine (Wyandotte Chemical Corporation).
[b] PPG 1000—Polypropylene glycol of 1000 average molecular weight (Carbide Chemical Corporation).
[c] Olefin-alcohol.

Other modifications in the alcohol-isocyanate reaction have been shown to produce novel solid polymers, for example:

9.5 parts of ethanol and 34.8 parts of Hylene TM, corresponding to an isocyanate/hydroxyl equivalent ratio of 2/1, were mixed at room temperature and a vigorous reaction ensued resulting in a light yellow (urethane) liquid. The pot temperature rose rapidly to about 140° C. The reaction mixture was then cooled to 28° C. and 0.25 part of diazabicyclooctane and 3.44 parts of propylene oxide added with mixing. A further exothermic reaction took place in which the temperature rose to about 120° C. in fifteen minutes. On cooling, a white solid resin was obtained which was readily powdered and found soluble in acetone, methyl isobutyl ketone, toluene and similar solvents.

Urethane modified polyisocyanates of the type here described are an interesting form of "blocked" isocyanates. In such compounds isocyanate groups are held in combination at ordinary temperatures but release isocyanate groups at higher temperatures to react further in polymer formation. Thus, ethanol, phenol, allyl alcohol and organo-silanols, such as trimethyl silanol, have been reacted with diisocyanates in the presence of diazabicyclooctane and alkylene oxides to form "urethane blocked" polyisocyanates which were solid to elastomeric polymers at ordinary temperatures but which dissociated in part to reactive isocyanate and hydroxy compound on heating at about 100 to 140° C.

We have also found that elastomers prepared from isocyanates and polyols catalyzed by the combination of diazabicyclooctane and alkylene oxides have unusually high resiliency which is not shown by conventional polyurethane elastomers. A number of resilient resins were made, either clear or with various amounts of gas occlusion, as well as both flexible and rigid low density foams.

In the following example, propylene oxide was used at 3 parts per 100 of polyol acting both as a cocatalyst and as a supplementary blowing agent. The minimum practical effect as a blowing agent was found at 0.5%, while at concentrations as high as 6% or more of propylene oxide the blowing reaction was too rapid, causing a "blowing out" of the foamed product.

EXAMPLE VI

Duplicate runs were made on the Bayer-Hennecke foam machine using:

100 parts of Dow 11–300, glycerine triol resin, 4000 mol. wt., ~45 OH number
40.5 parts of tolylene diisocyanate
0.5 part of diazabicyclooctane
0.4 part of stannous octoate, T9
3.0 parts of propylene oxide
2.9 parts of water
1.3 parts of silicone, DC 199.

The alkylene (propylene) oxide dissolved in the polyol and the "activator solution" of catalyst (tin octoate and diazabicyclooctane) and silicone dissolved in water were pumped to the foam machine mixing head. The polyol-activator stream met the TDI stream in the mixing head and the mixture was ejected through the mixing nozzle onto the machine belt. The creaming time noted was 3 seconds; and the rise time 44 and 46 seconds, respectively, for Foams "A" and "B." The significant physical characteristics of this foamed product are shown under items "A" and "B" in the following table. Foams "A" and "B" were compared with "C," a foam made omitting propylene oxide and with supplemental blowing provided by 10 parts of Freon 11 (trichlorofluoro-methane) per 100 parts of polyol. The cream time on this run was 6 to 7 seconds and the rise time 75 seconds.

| Foam | A | B | C |
|---|---|---|---|
| Density, lb./ft.$^3$ | 1.462 | 1.475 | 1.54 |
| Tensile, lb./in.$^2$ | 10.5 | 10.9 | 14.3 |
| Tear, lb./in. | 1.4 | 1.7 | 3.1 |
| Compress Load, lb./in.$^2$: | | | |
| 25% | .24 | .24 | .29 |
| 50% | .30 | .28 | .33 |
| 65% | .37 | .36 | .51 |
| 75% | .53 | .51 | .85 |
| Comp. Loss on Humid Aging, 25% | .18 | .19 | .23 |
| Comp. Loss | .06 | .05 | .06 |
| Comp. Loss, Percent | 25 | 18 | 21 |
| Compress Set, 50% | 13.3 | 13.3 | 12.1 |

It is evident that 3% of propylene oxide had an accelerating effect on the reaction, giving a notably shorter creaming and rising time than the reference run without propylene oxide. Furthermore, with the exothermic heat of condensation, propylene oxide was volatilized and produced a supplementary blowing effect which gave a lower density product despite supplementary blowing of the reference run obtained by the addition of 10 wt. percent of Freon 11 in the formulation.

A possible difficulty in making diazabicyclooctane-catalyzed one-shot foams in machine runs is the tendency to overmixing which accelerates the reaction between isocyanates and water causing a premature blowing and a rapid reduction in reactive NCO concentration, thus further slowing down the urethane reaction, by which linear elastomeric polyurethane resins are formed. On the other hand, the rapid polymerization of isocyanates effected by our alkylene oxide-diazabicyclooctane catalyst combination apparently acts as a means of holding or sequestering isocyanates as, e.g., the dimer, thus inhibiting the premature ureide reaction and overcoming the effect of overmixing in the foam machine head. In view of the controlled reaction of isocyanates obtained by our preferred diazabicyclooctane-alkylene oxide combination, the machine foam process can tolerate higher TDI to polyol indices leading, with auxiliary blowing due to propylene oxide, to good load-bearing, ultra-light foams.

EXAMPLE VII

A butylene oxide-diazabicyclooctane catalyst combination was used in making a casting resin having very good resiliency:

100 parts Dow 11–300 polyol, glycerine triol resin, 4000 mol. wt., ~45 OH number and
33 parts of TDI were mixed and degassed at 15 mm. Hg absolute pressure.
0.5 part of diazabicyclooctane in
8 parts of butylene oxide were added with stirring.

No creaming was noted in 10 to 15 seconds when the mixture was poured into a mold. It was generally noted that a trace of water as was usually present in organic hydroxy compounds and isocyanates was necessary to give the best reaction and that absolute dryness was not desirable. The mix was degassed by pressure reduction down to 15 mm. Hg. Further, after the mix had been cast, a vacuum was drawn (5 sec. to 10 sec. at 10 mm. Hg) on the mold to eliminate water vapor and avoid bubble formation. A mold of 200 cc. volume gelled in 10 to 15 minutes and was cured (released) in 40 to 60 minutes. The resin ball formed in this example had high resiliency, showing a 60% rebound.

Casting resins as described above can be varied in their properties by using more or less TDI, different alkylene oxides and different hydroxyl equivalent polyols. For example, with 25 parts TDI, less than the 33 parts used in Example VII, a more flexible resin was made showing a 70 to 75% rebound.

A rapid self-curing casting resin was made following Example VII in formulation except having only 20 parts of TDI and 2% of titanium dioxide per 100 parts of polyol as a filler and coloring agent. The mix was poured into a mold patterned on a standard golf ball. The resultant self-cured molded ball, removed after a 60-minute setting time, was a flexible elastic body having a 70–75% rebound and a coherent white surface similar to the commercial vulvanized rubber golf ball.

In the foregoing description and examples where alkylene oxides were employed as co-catalysts with active tertiary amines, such as diazabicyclooctane, the oxide was defined as a $C_2$ to $C_4$ alkylene oxide. The basis on which this limitation was made has been previously considered. In the presence of TDI-polyol mixtures the effect of varying the alkylene oxide used is further shown in the following runs:

certain cases. Ethylene oxide is very active though limited in use since it boils at 10° C. However, for low temperature reactions ethylene oxide and diazabicyclooctane are highly effective. In general, higher $C_8$–$C_{12}$, etc. alkylene oxides are not as active as the $C_2$–$C_4$ group. Condensation and polymerization reactions effected with these oxides are slower and their effect on curing is slight, being essentially the same as for diazabicyclooctane alone. Other lower molecular weight substituted epoxides, such as epichlorohydrin, are relatively inactive and undesirable, as shown in Example III, while higher molecular weight epoxides, such as the epoxide of oleic acid, are definitely less reactive and ineffective. With 5 to 10 parts of epichlorohydrin in the formulation

EXAMPLE VIII (a) NON-FOAMED ELASTOMERS WERE FORMED

| Polyol, g. | TDI g. | Diazabicyclooctane, g. | Alkylene Oxide | g. | Description | Gel Time in Min. |
|---|---|---|---|---|---|---|
| Dow 11-300 a (triol): | | | | | | |
| 100 | 25 | 0.5 | Propylene | 10 | Tended to foam rapid self-cure. | 10 |
| 100 | 25 | 0.5 | Butylene | 10 | Self-cured | 30 |
| 100 | 25 | 0.5 | Octylene | 10 | Slow cure | 60 |
| PPG 2000: b | | | | | | |
| 100 | 37 | 0.5 | None | | Not gelled after 3 days at room temp. | |
| 100 | 37 | 0.5 | Propylene | 0 34 | Light yellow dense solid in 3 days. | |

(b) FOAMED ELASTOMER WAS FORMED

| Dow 11-300: a | | | | | | |
|---|---|---|---|---|---|---|
| 100 | 40 | 0.5 / c 0.8 / d 2.9 | Propylene | 10 | Good foam, self-cured with no metal soap present. | | a Dow 11-300—Glycerine triol resin, 4000 mol. wt. ~45 OH number.
b PPG 2000—Polypropylene glycol, 2000 mol. wt.
c D.C. 199—Organo-silicone, Dow Corning.
d Water.

Similarly, when TDI and a triol were reacted in the presence of 0.5% of diazabicyclooctane to form a resin, there was a very pronounced effect of added butylene oxide. In the absence of butylene oxide, it took from 4 to 19 hours (overnight) for the mix to set while 4% of butylene oxide produced a set in 6 to 9 minutes:

DIAZABICYCLOOCTANE-BUTYLENE OXIDE CATALYZED URETHANE RUBBERS

| | | | | |
|---|---|---|---|---|
| TDI, g | 15 | 15 | 20 | 20 |
| LG 56, g a | 100 | 100 | 100 | 100 |
| Diazabicyclooctane, g | 0.5 | 0.5 | 0.5 | 0.5 |
| Butylene Oxide, g | 0 | 4.0 | 0 | 4.0 |
| Gel Set Time, Hr | 4–19 | 0.10 | 4–19 | 0.15 | a LG 56—Glycerine polypropoxide triol of about 3000 mol. wt. having an "OH" number of 56.

One of the projected uses for the active diazabicyclooctane-alkylene oxide catalyst combination is in the preparation of "one-shot" rigid foams, using this catalyst combination to effect rapid polymerization and crosslinking and Freon or propylene oxide to effect supplemental blowing. Foams having a heat conductivity [K factor (B.t.u./hr./ft.$^2$/° F./in.)] value of less than 0.14 and as low as 0.11 have been made.

The activity and stability of butylene oxide mark it as the preferred alkylene oxide for non-foamed products. While its rate of self-curing is moderate, it is still very active. Propylene oxide is more active in accelerating the polyurethane reaction and in effecting curing. Since it boils at about 35° C., it exerts its catalytic effect early in the reaction and then with increasing temperature acts as a supplementary blowing agent to produce lighter foams. However, this volatility may be undesirable in of Example VIII instead of butylene oxide, gel time and mold release time were longer than with butylene oxide, specifically 6 to 8 hours release time compared with 0.7 to 1 hour with butylene oxide.

In the preparation of specific products, whether as cast resins or foamed products, such formulations can be supplemented by the addition of coloring agents, reinforcing agents, fillers, to stabilize and the like. Just as in the above modification of Example VII where 2% of titanium dioxide was incorporated as a filler and coloring agent in a casting resin, carbon black, silica, wood flour, powdered resins can be added as fillers or extenders, glass fibers and polymeric resin fibers as reinforcing agents, etc. in quantities to obtain the desired physical properties of the composite product.

Obviously many modifications and variations of the invention as hereinbefore set forth may be made without departing from the spirit and scope thereof, and therefore only such limitations should be imposed as are indicated in the appended claims.

What is claimed is:

1. A non-aqueous catalyst composition active in the presence of organic isocyanates, comprising the combination of diazabicyclooctane and at least one of the alkylene oxides having 2 to 4 carbon atoms in unreacted form in which the mole ratio of diazabicyclooctane to alkylene oxide is from 100 moles of diazabicyclooctane to 1 of alkylene oxide to 1 mole of diazabicyclooctane per 20 moles of alkylene oxide.

2. A catalyst composition consisting essentially of the unreacted anhydrous combination of diazabicyclooctane and at least one $C_2$–$C_4$ alkylene oxide in which the mole ratio of diazabicyclooctane to alkylene oxide is from 100 moles of diazabicyclooctane to 1 of alkylene oxide to 1 mole of diazabicyclooctane per 20 moles of alkylene oxide.

3. A catalyst combination in accordance with claim 2 wherein said catalyst combination is unreacted diazabicyclooctane and butylene epoxide in which the mole ratio is from about 10 parts of diazabicyclooctane to 20 parts of epoxide.

References Cited in the file of this patent
UNITED STATES PATENTS

| | | |
|---|---|---|
| 2,764,565 | Hoppe et al. | Sept. 25, 1956 |
| 2,858,280 | Maltha | Oct. 28, 1958 |
| 2,927,084 | Wahl et al. | Mar. 1, 1960 |
| 2,939,851 | Orchin | June 7, 1960 |
| 3,010,963 | Erner | Nov. 28, 1961 |